United States Patent [19]

Ishida et al.

[11] Patent Number: 5,607,782
[45] Date of Patent: Mar. 4, 1997

[54] MAGNETIC RECORDING MEDIUM

[75] Inventors: Toshio Ishida; Masaki Satake; Tsutomu Okita, all of Odawara, Japan

[73] Assignee: Fuji Photo Film Co., Ltd., Kanagawa, Japan

[21] Appl. No.: 105,614

[22] Filed: Aug. 13, 1993

[30]  Foreign Application Priority Data

Aug. 21, 1992 [JP] Japan .................................. 4-222323

[51] Int. Cl.$^6$ ........................................................ G11B 5/66
[52] U.S. Cl. ............................. 428/694 T; 428/694 TP; 428/694 TF; 428/694 TR; 428/900
[58] Field of Search ............................. 428/694 T, 900, 428/694 TP, 694 TR, 694 TF

[56]  References Cited

U.S. PATENT DOCUMENTS

| | | | |
|---|---|---|---|
| 4,267,238 | 5/1981 | Chernega et al. | 428/422 |
| 4,735,848 | 4/1988 | Kondo et al. | 428/219 |
| 4,816,334 | 3/1989 | Yokoyama | 428/336 |
| 4,833,031 | 5/1989 | Kurokowa et al. | 428/336 |
| 4,837,116 | 6/1989 | Anoka et al. | 428/141 |
| 5,069,973 | 12/1991 | Saito | 428/421 |
| 5,094,898 | 3/1992 | Movita et al. | 428/65.4 |
| 5,128,216 | 7/1992 | Ng | 428/694 BP |

*Primary Examiner*—Leszek Kiliman
*Attorney, Agent, or Firm*—Sughrue, Mion, Zinn, Macpeak & Seas

[57]  ABSTRACT

A magnetic recording medium, comprising a magnetic layer having ferromagnetic metallic thin film at least on one side of a non-magnetic support, whereby a layer is formed on the magnetic layer, said layer contains at least one type of fluorine compounds having at least two perfluoroalkyl groups given by the following general formula (1) or (2) and one or more polar groups selected from —OH, —COOM, —SO$_3$M, —OSO$_3$M, —PO$_3$M$_2$ or —OPO$_3$M$_2$ (M representing hydrogen atom, alkali metal or ammonium):

General formula (1)

$$CF_3CF_2(CF_2)_n(CH_2)\text{—}_m$$

General formula (2)

$$(CF_3)_2CF(CF_2)_n(CH_2)\text{—}_m$$

where n is a number of 2 to 10, m is a number of 1 to 18, and n+m are an integer of 6 to 26.

19 Claims, No Drawings

MAGNETIC RECORDING MEDIUM

BACKGROUND OF THE INVENTION

The present invention relates to a magnetic recording medium having a lubricating layer, which contains an organic fluorine compound on a magnetic layer, and in particular to a magnetic recording medium, which has a magnetic layer consisting of ferromagnetic metallic thin film with higher lubricating property and rust preventive property.

Magnetic recording medium such as magnetic tape, floppy disk, etc. is used with lubricant coated on the surface of the magnetic layer to increase lubricating property and running durability between the magnetic recording medium and a head.

In particular, with rapid technical progress toward the recording with higher density in magnetic recording medium, the surface of the magnetic layer is getting increasingly smoother. Also, magnetic recording medium is used in various environmental conditions, and the recorded information is stored over a period from several years to several tens of years. For this reason, there are strong demands on the medium with high running durability and preservation stability under various environmental conditions, and sufficient results cannot be obtained by conventional type lubricant.

Further, cam-corder, i.e. camera-integrated video tape recorder or small size video tape recorder are frequently used in outdoor application, and high lubricating performance characteristics suitable for the use under extensive environmental conditions are required for a magnetic recording medium.

Metal thin film type magnetic layer is advantageous for high density recording, and there are much expectations on the metal thin film type for the improvement of magnetic recording density such as the implementation of high-television system or digitalization in future. Because metal in the recording layer is protected only by very thin oxide layer in the metal thin film type magnetic recording medium, there is imminent demand on a lubricant, which can extensively improve the preservation property.

It is known that it is effective to use an organic fluorine compound as lubricant in such metal thin film type magnetic recording medium.

It is widely known that an organic fluorine compound containing perfluoroalkyl group has hydrophobic as well as lipophobic property and has the property as surface active agent in both water and oil. Also, it has the property to decrease surface energy, and the organic fluorine compound is practically used by coating it to improve the sliding property or lubricating property of a material.

For example, Japanese Patent Laid-Open Publication No. 58-100228 discloses a technique, in which a compound having sulfonic metal salt as polar group, an ester group as connecting group, and two fluorine-substituted alkyl groups on molecular terminals is mixed in a coating solution containing dispersed magnetic powder, and this is coated. Because this compound contains sulfonic acid metal salts as polar groups and the polar groups have high polarity and have strong property as acid, and there are problems such as corrosion of metal thin film or thin film head used for high density recording. Because chain length of molecular chain of perfluoroalkyl group is short, sufficient decrease of friction coefficient cannot be expected when it is used as protective layer of ferromagnetic metallic thin film type magnetic recording medium. Further, it is inferior in solubility in non-fluorine type organic solvent, while fluorine type organic solvent must be used to form the protective layer, and this causes environmental problem. Also, the lubricant itself is susceptible to hydrolysis and cannot endure long-term storage.

Japanese Patent Publication Laid-Open 6-253634 describes a lubricant expressed by $(C_nF_{2n+1}Y_mO)_k=O(OX)_{3-k}$, and alkylene group, alkyleneoxide or sulfonamide are disclosed as connecting group for phosphoric acid ester and fluorine chain, while this is not soluble in non-fluorine type solvents.

Japanese Patent Publication 3-19602 and Japanese Patent Publication Laid-Open 54-79366 describe lubricants, comprising fluorine type hydrocarbon compound having $-SO_3Na$, $-SO_3K$, $-SO_3H$, $-COOH$, etc., and concrete examples are given such as $C_8F_{17}SO_2F$, terminal OH or $SO_3H$ of perfluoroalkyl polyoxyethylene, or terminal betaine structure of $R_fCONH(CH_2)_3$, but these compounds are inferior in μ value, still durability and preservation property and are not soluble in hydrocarbon type solvents.

Japanese Patent Publications Laid-Open 3-241524 and 62-92227 describe coating of compounds having perfluoroalkyl group and aliphatic alkyl group on ferromagnetic metallic thin film. These compounds can be coated by means of isopropanol, while these are inferior in μ value, still durability and preservation property.

Japanese Patent Publication Laid-Open 64-72313 describes formation of monomolecular layer of perfluoroalkyl group - alkyl group - polar group on ferromagnetic metallic thin film, while formation of monomolecular film by Langmuir-Blodgett (LB) film is low in productivity. Further, the compound is inferior in μ value, still durability and preservation property.

In addition to the coating of the above lubricant on magnetic recording layer, the use of perfluoroalkyl polyether and its derivatives is described (Japanese Patent Laid-Open Publications 60-61918, 61-07528, U.S. Pat. 3,778,308, Japanese Patent Publication 60-10368, U.S. Pat. 4,897,211, etc.). However, the lubricants containing fluorine type organic compound has high friction coefficient at low speed with the partner material when tape is sliding. The lubricants have also problems with preservation property because magnetic layer is detached due to corrosion by acidic gas such as sulfur dioxide and are not suitable as magnetic recording medium used in practical application.

Fatty acids and fatty acid esters (Japanese Pat. Publications 28-28367, 51-39081, 51-30981, Japanese Patent Publications Laid-Open 56-80828 and 61-24017) have high speed friction with magnetic head and are not suitable for practical use. It is also inferior in the problem of corrosion due to acidic gas such as sulfur dioxide.

Most of the above lubricants are not soluble in organic solvents of normal hydrocarbon type, such as acetone, methylethylketone, ethyl acetate, alcohols, toluene, etc., and it is necessary to use fluorine type organic solvents when coating. However, fluorine type organic solvents are expensive and also cause the problem of the destruction of ozone layer or aggravate the working environment and are not suitable for practical application.

It is an object of the present invention to provide a lubricant, which is soluble in general hydrocarbon type organic solvents and contains fluorine type organic compound without the need of using fluorine type organic solvents and also to provide a magnetic recording medium, which comprises metal thin film for extensively improving recording density by deposition, sputtering, etc. and which can offer high running property, durability and preservation property.

Further, it is another object of the present invention to provide a magnetic recording medium which has sufficient running property and durability even in outdoor environment and which does not corrode magnetic head for high density recording such as thin film head.

SUMMARY OF THE INVENTION

The present invention provides a magnetic recording medium having a magnetic layer of ferromagnetic metallic thin film at least on one side of a non-magnetic support whereby a protective layer containing at least one of fluorine compounds having at least two of perfluoroalkyl groups given by the following general formulae (1) or (2) and one or more polar groups selected from the groups of —OH, —COOM, —SO$_3$M, —OSO$_3$M, —PO$_3$M$_2$, —OPO$_3$M$_2$ (M represents hydrogen atom, alkali metal or ammonium), is formed on the magnetic layer:

General formula (1)

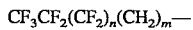

General formula (2)

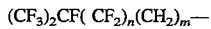

where n is a number of 2 to 10, m is a number of 1 to 18, and n+m ape an integer from 6 to 26.

Also, the present invention provides a magnetic recording medium according to Claim 1, wherein the fluorine compound is at least one of compounds given by the following general formulae (3) to (5):

General formula (3)

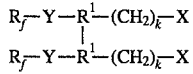

General formula (4)

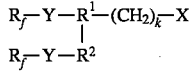

General formula (5)

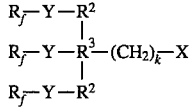

where R$_f$ represents a perfluoroalkyl group given by the general formulae (1) or (2), Y represents a bivalent connecting group, X represents —OH, —COOM, —SO$_3$M, —O(CH$_2$)$_b$SO$_3$M, —PO$_3$M$_2$ or —OPO$_3$, and M represents hydrogen atom, alkali metal or ammonium, b is an integer from 0 to 4, R$^1$ represents CH, CH$_2$C, or (CH$_3$)C, R$^2$ represents H, CH$_2$, CH$_2$CH$_2$, CH$_2$CH$_2$CH$_2$, or CH(CH$_3$), R$^3$ represents C, CH$_2$C, or CH$_2$CH$_2$C, k is an integer from 0 to 2, and R$_f$, X, Y, R$^1$, R$^2$ and k in the same molecule may not be the same.

Also, the present invention provides a magnetic recording medium, wherein the layer having fluorine compound formed on the magnetic layer contains a rust preventive agent.

DESCRIPTION OF THE PREFERRED EMBODIMENT

The present invention provides a magnetic recording medium, comprising a magnetic layer made of ferromagnetic metallic thin film formed at least on one side of a non-magnetic support, whereby a protective layer is formed on said magnetic layer, said protective layer contains at least one type of fluorine compounds having at least two perfluoroalkyl groups given by the following general formulae (1) or (2) and one or more polar groups selected from groups of —OH, —COOM, —SO$_3$M, —OSO$_3$M, —PO$_3$M$_2$ and —OPO$_3$M$_2$ (M representing hydrogen atom, alkali metal or ammonium):

General formula (1)

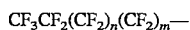

General formula (2)

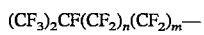

where n is a number of 2 to 10, m is a number of 1 to 18, and n+m are an integer of 6 to 26.

In particular, it is preferable that fluorine compound is at least one of the compounds given by the following general formulae (3) to (5):

General formula (3)

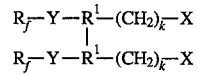

General formula (4)

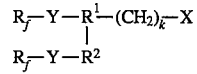

General formula (5)

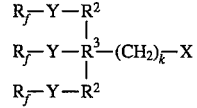

where R$_f$ is a perfluoroalkyl group given by the general formulae (1) or (2), Y represents a bivalent connecting group, X represents —OH, —COOM, —SO$_3$M, —O(CH$_2$)$_b$SO$_3$M, —PO$_3$M$_2$, or —OPO$_3$, M represents hydrogen atom, alkali metal or ammonium, b is an integer of 0 to 4, R$^1$ represents CH, CH$_2$C, or (CH$_3$)C, R$^2$ represents H, CH$_2$, CH$_2$CH$_2$, CH$_2$CH$_2$CH$_2$, or CH(CH$_3$), R$^3$ represents C, CH$_2$C,, CH$_2$CH$_2$C, and k is an integer of 0 to 2, while R$_f$, X, Y, R$^1$, R$^2$ and k in the same molecule may not be the same.

Further, in the fluorine compound described by the general formulae (3) to (5), it is preferable that R$_f$ and Y in the same molecule have the same length because higher regularity can be provided when oriented on the surface of the magnetic layer and better orientation property and higher lubricating property can be attained.

Also, it is preferable that R$^1$, R$^2$ and R$^3$ are chemically stable and each represents a hydrocarbon group.

If k is 3 or more, it is not desirable because the distance between the polar group X and the perfluoroalkyl molecular chain is opened widely and orientation property of R$_f$ decreases.

In the perfluoroalkyl group given by the general formulae (1) or (2), solubility in organic solvents decreases regardless of whether m is big or small, and it is preferable that m is within the range of 1 to 18.

It is preferable that the bivalent group Y is amide ester, thiol ether, sulfoxide or sulfone.

Preferably, n is a number of 4 to 8, m is a number of 2 to 11, and n+m are a number of 8 to 19;

Y represents —OCO—, or —COO—;

X represents —OH, —O $(CH_2)_b SO_3M$, or —$PO_3M_2$;

M represents hydrogen atom, sodium, potassium or ammonium;

b is an integer of 0 to 4;

$R^1$ represents CH or $CH_2C$;

$R^2$ represents $CH_2$ or $CH_2CH_2$;

$R_3$ represents C or $CH_2C$,; and k is an integer of 0 to 2.

For the magnetic recording medium of the present invention, fluorine compound to form a protective layer can be synthesized by reaction already known.

For example, the following methods may be used: a method to add $NaHSO_3$ to product of the reaction of itaconic acid with perfluoroalkyl ethyl alcohol, a method to add $NaHSO_3$ to product of the reaction of maleic acid anhydride with perfluoroalkyl butyl alcohol, reaction of tartaric acid with perfluoroalkyl butyl alcohol, reaction of citric acid with perfluoroalkyl pentyl alcohol, and a method to react butane salton with these compounds having a plurality of perfluoroalkyl chains thus obtained and to degenerate this to sulfonic acid.

In the magnetic recording medium of the present invention, the layer containing the above fluorine compound can be formed on the magnetic layer by dissolving hydrocarbon solvent and coating it. This advantage is derived from structural feature of the fluorine compound of the present invention that it contains hydrocarbon group in perfluoroalkyl group. As the hydrocarbon type solvents, acetone, methylethylketone, methylisobutylketone, cyclohexane, methanol, ethanol, isopropanol, etc. may be used. In particular, from the viewpoints of solubility and process safety, it is preferable to use methylethylketone, methylisomethylketone, cyclohexane and isopropanol.

As the material for the ferromagnetic metallic thin film of the present invention, it is preferable to use iron, cobalt, nickel or ferromagnetic metallic or ferromagnetic alloy such as Fe—Co, Fe—Ni, Fe—Rh, Co—P, Co—B, Co—Y, Co—La, Co—Ce, Co—Pt, Co—Sm, Co—Mn, Co—Cr, Fe—Co—Ni, Co—Ni—P, Co—Ni—B, Co—Ni—Ag, Co—Ni—Nd, Co—Ni—Ce, Co—Ni—Zn, Co—Ni—Cu, Co—Ni—W, Co—Ni—Re, etc. processed by deposition, preferably with thickness of 0.02 to 2 µm.

The above ferromagnetic metallic thin film may contain oxygen, nitrogen, chromium, gallium, arsenic, strontium, zirconium, niobium, molybdenum, rhodium, palladium, tin, antimony, tellurium, promethium, rhenium, osmium, iridium, gold, mercury, lead, magnesium, bismuth, etc.

For the non-magnetic support used in the present invention, plastics such as polyethylene terephthalate, polyimide, polyamide, polyvinyl chloride, cellulose triacetate, polycarbonate, polyethylene naphthalate, polyphenylene sulfide, or aluminum, titanium, stainless steel, glass, etc. may be used.

To increase running durability, it is effective to provide fine projections on the surface of the non-magnetic support before ferromagnetic metallic thin film is formed because this produces adequate irregularities on the surface of the magnetic layer. The density of fine projections on the surface of the non-magnetic support is preferably $2\times10^6$ to $2\times10^8$, and height of the projection is preferably 1 to 50 nm. The thickness of the non-magnetic support differs according to the intended purpose and it is generally 3 to 50 µm.

To increase adhesion of the ferromagnetic metallic thin film, an intermediate layer may be placed between the non-magnetic base material and the ferromagnetic metallic thin film.

To increase running property of the magnetic recording medium of the present invention, a back-coat layer may be arranged, which consists of coating film primarily made of fine powder such as carbon black and bonding resin on the surface opposite to the surface of the non-magnetic support where magnetic recording layer is formed.

For the magnetic recording medium of the present invention, the magnetic layer prepared by dispersing magnetic powder in bonding agent and coated on the non-magnetic support or ferromagnetic metallic thin film formed on the non-magnetic support may be used. A magnetic layer made of ferromagnetic metallic thin film containing metals such as iron, nickel, cobalt, etc. or their alloys are preferably used.

Particularly, it is preferable to use a film of PET, PEN, polyamide, polimide resin of 5 to 15 µm in thickness, and the thickness of the magnetic layer is preferably 0.1 to 0.3 µm. The magnetic layer is preferably a mono-layer, parallel type multi-layer or non-parallel type multi-layer containing cobalt by 80 weight % or more, and nickel, chromium, etc. in addition. To form magnetic layer, the methods such as deposition, sputtering, etc. may be used. More preferably, the magnetic layer is formed by deposition method in the presence of oxygen.

The lubricant of the present invention can be added by coating it on the thin film metal recording medium, which consists of carbon film formed on metal thin film magnetic layer by plasma CVD or other methods (alkane such as $CH_4$, $C_2H_6$, $C_3H_8$, $C_4H_{10}$, etc. as gas, alkene such as $CH_2=CH_2$, $CH_3CH=CH_2$, etc., alkyne such as $CH\equiv CH$ and other volatile compounds).

Further, the layer containing fluorine compound of the present invention has high rust preventive property, and the property as the magnetic recording medium can be improved when it contains a rust preventive consisting of tetrazaindene cyclic compound and/or thiouracil cyclic compound.

As tetrazaindene cyclic compound usable for this purpose, the compound given by the following formula may be used:

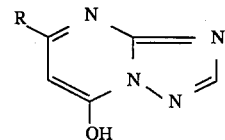

where R is a hydrocarbon group selected from alkyl group, alkoxyl group or alkylamide group.

More preferably, the number of carbon atoms is 3 to 26 inclusive. In case of alkoxyl group, R in $ROCOCH_2$— represents $C_3H_7$—, $C_6H_{13}$—or phenyl. In case of alkyl group, it is $C_6H_{13}$—$C_9H_{19}$—, or $C_{17}H_{35}$—. In case of alkylamide group, R in $RNHCOCH_2$ is phenyl or $C_3H_7$—.

Thiouracil cyclic compound may be a compound given by the following formula:

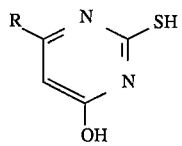

where R represents a hydrocarbon group, which may contain substitution group other than carbon and hydrogen, and which contains 3 or more carbon atoms.

Lubricant and rust preventive may be mixed and coated simultaneously, while it is more effective to coat the rust preventive first and the lubricant thereafter. To coat these substances, these may be dissolved in organic solvent and can be coated by normal coating method such as coil bar.

It is preferable to coat the rust preventive by 0.1 to 5.0 mg/m², and the lubricant by 1.0 to 50 mg/m². More preferably, the rust preventive is coated by 0.3 to 3 mg/m² and the lubricant by 3 to 30 mg/m².

Other lubricant may be simultaneously used with the lubricant containing organic fluorine compound of the present invention. For example, perfluoropolyether given by the formula:

$$CF_3-(CFR_f CF_2-O)-nCF_2CF_3$$

or a compound, in which terminals of the above compound are denatured with OH, COOH, etc. may be used. Here, $R_f$ represents $CF_3$ or F, and molecular weight is 1000 to 20000, or more preferably, 2500 to 10000. More concretely, KRYTOX K143AZ or KRYTOX K157FSL manufactured by DuPont, FOMBLIN AM2001 manufactured by Montefluos, or DEMNUM SY manufactured by Daikin Industry are used.

The present invention provides a magnetic recording medium, which comprises a magnetic layer made of ferromagnetic metallic thin film formed at least on one side of a non-magnetic support, whereby a layer containing at least one type of fluorine compound, which has at least two perfluoroalkyl groups and one or more polar groups selected from the groups —OH, —COOM, —SO₃M, —OSO₃M, —PO₃M₂, —OPO₃M₂ (M representing hydrogen atom, alkali metal, or ammonium). Because the fluorine compound is soluble in hydrocarbon type organic solvents, coating film can be easily formed on the magnetic layer, and the perfluoroalkyl group of fluorine compound adsorbed on the surface of the magnetic layer is oriented on the surface as a protective layer and provides high lubricating property. Further, simultaneous use of a rust preventive gives higher effect.

In the following, detailed description will be given on the features on the invention, referring to some embodiments.

(EXAMPLES AND COMPARATIVE EXAMPLES)

On polyethylene terephthalate of 100 μm thick, a cobalt-nickel magnetic film (150 nm thick) was formed by diagonal deposition, and a ferromagnetic metallic thin film layer was prepared. Electron beam evaporating source was used as an evaporating source, and cobalt-nickel alloy (Co: 80 weight %; Ni: 20 weight %) was charged on it. While introducing oxygen gas under vacuum degree of $6.7\times10^{-3}N/m^2$, diagonal deposition was performed at an incident angle of 50 degrees. On the ferromagnetic metallic thin film thus obtained, solutions of fluorine compound and rust preventive as shown in Tables 1 and 2 were coated by coil bar.

A back layer was provided on the non-magnetic support, and a magnetic tape was prepared by slitting to the width of 8 mm.

The magnetic tape thus obtained was evaluated by the following method. The results are summarized in Tables 1 and 2.

[Method of evaluation]
(1) Measurement of friction coefficient

The magnetic tape prepared above and a stainless ball were brought into contact by tensile force ($T_1$) of 30 g at a contact angle of 180°. The tensile force ($T_2$) required to run the magnetic tape at 3.3 cm/sec was measured.

Friction coefficient μ of the magnetic tape was obtained by the following equation:

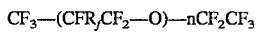

Friction coefficient was determined on the magnetic tape at 23° C. and 70% relative humidity under the following conditions: (A) with the conditions unchanged (before storage); and (B) after stored for 7 days under the condition of 60° C. and 90% relative humidity.

(2) Measurement of still durability

Using 8 mm VTR (Fuji Photo Film Co., LTD.; FUJIX-8M6), image was reproduced under still condition without operating still limiting mechanism, and the time until no image appeared any more was measured and evaluated.

Still durability was determined at 5° C. and 10% relative humidity on the magnetic tape under the following two conditions: (A) with the conditions unchanged (before storage); and (B) after stored for 7 days under the condition of 60° C. and 90% relative humidity.

(3) Evaluation of weatherproof property

The magnetic tape was stored under the following conditions and the surface of the magnetic layer after storage was examined by visual inspection and under light microscope:

$Cl_2$ : 10 ppb $NO_2$ : 200 ppb $H_2S$: 10 ppb

Flow rate of mixture containing the above three gases: 1000 liters/hr.

Temperature and humidity: 60° C.; 90% RH

Days of storage: 10 days

| Evaluation criteria | |
|---|---|
| ○ | When the surface of magnetic layer was examined under light microscope (×200), no sign of corrosion is found. |
| Δ | When examined as above, corrosion is found, but metallic luster is seen on the surface of magnetic layer by visual inspection. |
| X | When examined by visual inspection, no metallic luster is seen on the surface of magnetic layer. |

TABLE 1

| Specimen No. | Chemical structure of coating material | Coating q'ty (mg/m$^2$) | Measuring conditions | μ value | Still durability (min.) | Rust |
|---|---|---|---|---|---|---|
| 1 | $C_8F_{17}CH_2CH_2OCOCHOH$<br>\|<br>$C_8F_{17}CH_2CH_2OCOCHOH$ | 10 | A<br>B<br>C<br>D | 0.20<br>0.23<br>0.25<br>0.21 | 30 or more<br><br><br>30 or more | o |
| 2 | $C_8F_{17}CH_2CH_2OCOCH_2$<br>\|<br>$C_8F_{17}CH_2CH_2OCOC-OH$<br>\|<br>$C_8F_{17}CH_2CH_2OCOCH_2$ | 20 | A<br>B<br>C<br>D | 0.21<br>0.23<br>0.24<br>0.21 | 30 or more<br><br><br>30 or more | o |
| 3 | $C_6F_{13}C_2H_4OCOCH_2$<br>\|<br>$C_6F_{13}CH_2CH_2OCOCHCH_2O(CH_2)_4SO_3Na$ | 10 | A<br>B<br>C<br>D | 0.24<br>0.27<br>0.29<br>0.25 | 30 or more<br><br><br>30 or more | o |
| 4 | $CF_3$<br>$\phantom{CF_3}\!\!\!\searrow\!\!CF(CF_2)_4(CH_2)_{11}OCOCHO(CH_2)_3SO_3Na$<br>$CF_3\!\!\nearrow$<br>\|<br>$CF_3$<br>$\phantom{CF_3}\!\!\!\searrow\!\!CF(CF_2)_4(CH_2)_{11}OCOCHO(CH_2)_3SO_3Na$<br>$CF_3\!\!\nearrow$ | 10 | A<br>B<br>C<br>D | 0.22<br>0.23<br>0.25<br>0.22 | 30 or more<br><br><br>30 or more | o |
| 5 | $C_4F_9(CH_2)_{11}OCOCH-SO_3Na$<br>\|<br>$C_4F_9(CH_2)_{11}OCOCH_2$ | 10 | A<br>B<br>C<br>D | 0.20<br>0.23<br>0.24<br>0.20 | 30 or more<br><br><br>30 or more | o |
| 6 | $C_{10}F_{21}C_4H_8OCOCH_2$<br>\|<br>$C_{10}F_{21}C_4H_8OCOCCPO_3H_2$<br>\|<br>$C_{10}F_{21}C_4H_8OCOCH_2$ | 10 | A<br>B<br>C<br>D | 0.21<br>0.24<br>0.24<br>0.22 | 30 or more<br><br><br>30 or more | o |
| 7 | $C_6F_{13}CH_2OCOCHOSO_3Na$<br>\|<br>$C_6F_{13}CH_2OCOCHOSO_3Na$ | 30 | A<br>B<br>C<br>D | 0.22<br>0.24<br>0.25<br>0.22 | 30 or more<br><br><br>30 or more | o |
| 8 | $C_8F_{17}CH_2CH_2OCOCH_2OCH-OSO_3Na$<br>\|<br>$C_8F_{17}CH_2CH_2OCOCH_2OCH_2$ | 10 | A<br>B<br>C<br>D | 0.19<br>0.22<br>0.23<br>0.20 | 30 or more<br><br><br>30 or more | o |

Measuring conditions:
A: 23° C.; 70% RH
B: 5° C.; 80% RH
C: 40° C.; 80% RH
D: 60° C. after stored

TABLE 2

| Specimen No. | Chemical structure of coating material | Coating q'ty (mg/m$^2$) | Measuring conditions | μ value | Still durability (min.) | Rust |
|---|---|---|---|---|---|---|
| 9 | $H(CF_2CF_2)_3CH_2OCOCH_2$<br>\|<br>$H(CF_2CF_2)_3CH_2OCOCHSO_3Na$ | 10 | A<br>B<br>C<br>D | 0.28<br>0.32<br>0.35<br>0.30 | 15<br><br><br>13 | Δ |
| 10 | $CF_3CF_2CF_2CH_2OCOCH_2$<br>\|<br>$CF_3CF_2CF_2CH_2OCOCHSO_3Na$ | 20 | A<br>B<br>C<br>D | 0.42<br>0.50<br>0.55<br>0.50 | 3<br><br><br>1 | x |
| 11 | $C_8F_{17}CH_2COOH$ | 10 | A<br>B<br>C<br>D | 0.43<br>0.55<br>0.60<br>0.49 | 10<br><br><br>7 | Δ |
| 12 | $C_6F_{13}(CH_2)_8OH$ | 10 | A<br>B | 0.29<br>0.35 | 20 | Δ |

TABLE 2-continued

| Specimen No. | Chemical structure of coating material | Coating q'ty (mg/m²) | Measuring conditions | μ value | Still durability (min.) | Rust |
|---|---|---|---|---|---|---|
| | | | C | 0.37 | | |
| | | | D | 0.32 | 15 | |
| 13 | $C_{10}F_{21}CH_2CH_2O$\\$\quad\quad\quad\quad\quad\quad$P—OH\\$C_{10}F_{21}CH_2CH_2O$ // O | 10 | A | 0.25 | 18 | x |
| | | | B | 0.28 | | |
| | | | C | 0.30 | | |
| | | | D | 0.31 | 9 | |
| 14 | $C_{10}F_{21}(CH_2)_{11}OCOCH$—$SO_3Na$\\ \|\\ $C_{10}F_{21}(CH_2)_{11}OCOCH_2$ | 10 | A | 0.22 | 30 or more | o |
| | | | B | 0.24 | | |
| | | | C | 0.25 | | |
| | | | D | 0.23 | 30 or more | |
| 15 | $C_6F_{13}(CH_2)_6OCOCH_2CH_2$\\ \|\\ $C_6F_{13}(CH_2)_6OCOCH_2CH$—OH | 10 | A | 0.20 | 30 or more | o |
| | | | B | 0.22 | | |
| | | | C | 0.23 | | |
| | | | D | 0.20 | 30 or more | |
| 16 | $C_8F_{17}CH_2CH_2OCOCHOH$\\ \|\\ $C_8F_{17}CH_2CH_2OCOCHOH$ | 10 | A | 0.20 | 30 or more | o |
| | | | B | 0.23 | | |
| | | | C | 0.25 | | |
| | 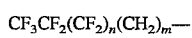 | 1 | D | 0.20 | 30 or more | |

Measuring conditions:
A: 23° C.; 70% RH
B: 5° C.; 80% RH
C: 40° C.; 80% RH
D: 60° C. after stored By the present invention, it is possible to provide a protective layer, which has high preservation property, running property and durability, and also to provide a magnetic recording medium for high density. This is because the lubricant having specific structure as disclosed by the present invention adsorbs on the surface of the magnetic layer, and water-repellent and oil-repellent property of a plurality of perfluoroalkyl chains serves to provide a protective layer and decreases energy. Thus, excellent lubricant can be provided. In particular, simultaneous presence of perfluoroalkyl chain and hydrocarbon in one molecule increases solubility in hydrocarbon type organic solvents, and it is possible to form the protective layer by hydrocarbon type organic solvents. The ratio of the perfluoroalkyl chain giving lubricating property to the polar group giving adsorption property on magnetic layer is 1 in conventional type compound, while it is 2 or more in the present invention. A single adsorption group gives the same lubricating property as given by two or more adsorption groups. This also applies to the compound of the general formula (4). In the compound of the general formula (4), there are two adsorption groups in a molecule, and two groups giving lubricating property, but these serve substantially as a single adsorption group because the distance between the adsorption groups is small.

Further, in the metal thin film type magnetic recording medium, higher preservation property can be attained by simultaneous use with a rust preventive. This is because the magnetic layer is prevented from rusting by maintaining affinity between hydrocarbon component of lubricant and the rust preventive.

What we claim is:

1. A magnetic recording medium, comprising a magnetic layer having a ferromagnetic metallic thin film at least on one side of a non-magnetic support, whereby a layer is formed on the magnetic layer, said layer containing at least one fluorine compound, which is a compound having a formula selected from the group consisting of:

Formula (3)

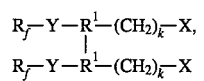

and

Formula (4)

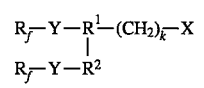

where $R_f$ represents a perfluoroalkyl group having either formula (1) or (2), Y represents a bivalent connecting group, X represents —OH, —SO₃M, —OSO₃Na, —COOH, or —PO₃M₂, where M represents a hydrogen atom, an alkali metal or ammonium, b is an integer of 0 to 4, $R^1$ represents CH, CH₂C, or (CH₃)C, $R^2$ represents CH₂, CH₂CH₂, CH₂CH₂CH₂, or CH(CH₃) , k is an integer of 0 to 2, and $R_f$, X, Y, $R^1$, $R^2$ and k in the same molecule may not be the same, and Formula (1)

$CF_3CF_2(CF_2)_n(CH_2)_m$—

Formula (2)

(CF$_3$)$_2$CF(CF$_2$)$_n$(CH$_2$)$_m$— where n is a number of 0 to 10, m is a number of 1 to 18, and n+m are an integer of 8 to 18.

2. A magnetic recording medium according to claim 1, wherein the layer containing the fluorine compound formed on the magnetic layer contains a rust preventing agent.

3. The magnetic recording medium according to claim 1, wherein Y represents an amide ester, a thiol ether, a sulfoxide or a sulfone.

4. The magnetic recording medium according to claim 1, wherein n is a number between 4 to 8.

5. The magnetic recording medium according to claim 1, wherein m is a number between 2 to 11.

6. The magnetic recording medium according to claim 1, wherein M represents a hydrogen atom, sodium, potassium or ammonium.

7. The magnetic recording medium according to claim 1, wherein $R_1$ represents CH or CH$_2$C.

8. The magnetic recording medium according to claim 1, wherein $R_2$ represents CH$_2$ or CH$_2$CH$_2$.

9. The magnetic recording medium according to claim 1, wherein the layer containing the fluorine compound formed on the magnetic layer is coated thereon in an amount of 1.0 to 50 mg/m$^2$.

10. The magnetic recording medium according to claim 2, wherein the rust preventing agent is a tetraazaindene cyclic compound or a thiouracil cyclic compound.

11. The magnetic recording medium according to claim 2, wherein the rust preventing agent is present in an amount of 0.1 to 5.0 mg/m$^2$.

12. The magnetic recording medium according to claim 3, wherein Y represents —OCO— or —COO—.

13. The magnetic recording medium according to claim 9, wherein the layer containing the fluorine compound formed on the magnetic layer is coated thereon in an amount of 3 to 30 mg/m$^2$.

14. The magnetic recording medium according to claim 10, wherein the tetraazaindene cyclic compound has the formula:

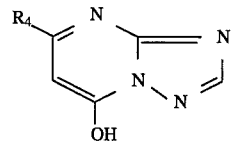

where $R_4$ is a hydrocarbon group containing 3 to 36 carbon atoms selected from the group consisting of an alkyl group, an alkoxyl group and an alkylamide group.

15. The magnetic recording medium according to claim 10, wherein the thiouracil cyclic compound has the following formula:

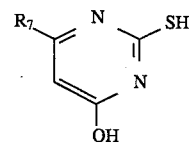

where $R_7$ represents a hydrocarbon group containing at least 3 carbon atoms.

16. The magnetic recording medium according to claim 11, wherein the rust preventing agent is present in an amount of 0.3 to 3 mg/m$^2$.

17. The magnetic recording medium according to claim 14, wherein the alkyl group is C$_6$H$_{13}$—, C$_9$H$_{19}$— or C$_{17}$H$_{35}$—.

18. The magnetic recording medium according to claim 14, wherein the alkoxyl group has the formula R$_5$OCOCH$_2$—, where $R_5$ represents C$_3$H$_7$—, C$_6$H$_{13}$— or phenyl.

19. The magnetic recording medium according to claim 14, wherein the alkylamide group has the formula R$_6$NHCOCH$_2$, where $R_6$ represents phenyl or C$_3$H$_7$—.

* * * * *